(12) United States Patent
Dominick et al.

(10) Patent No.: US 10,793,065 B2
(45) Date of Patent: Oct. 6, 2020

(54) MULTI-COLOR ILLUMINATION DEVICE

(71) Applicant: Rebo Lighting & Electronics, LLC, Ann Arbor, MI (US)

(72) Inventors: John R. Dominick, Ann Arbor, MI (US); Todd Irgang, Saline, MI (US)

(73) Assignee: REBO LIGHTING & ELECTRONICS, LLC, Ann Arbor, MI (US)

( * ) Notice: Subject to any disclaimer, the term of this patent is extended or adjusted under 35 U.S.C. 154(b) by 0 days.

(21) Appl. No.: 16/374,027

(22) Filed: Apr. 3, 2019

(65) Prior Publication Data

US 2019/0308552 A1 Oct. 10, 2019

Related U.S. Application Data

(60) Provisional application No. 62/653,681, filed on Apr. 6, 2018.

(51) Int. Cl.
| | | |
|---|---|---|
| *B60Q 3/74* | (2017.01) | |
| *B60Q 3/30* | (2017.01) | |
| *B60Q 3/20* | (2017.01) | |
| *B60Q 3/85* | (2017.01) | |

(52) U.S. Cl.
CPC .............. *B60Q 3/74* (2017.02); *B60Q 3/20* (2017.02); *B60Q 3/30* (2017.02); *B60Q 3/85* (2017.02)

(58) Field of Classification Search
CPC ... B60Q 3/20; B60Q 3/30; B60Q 3/74; B60Q 3/85; B60Q 3/14; B60Q 3/62; B60Q 3/88; B60Y 2200/92; B60Y 2200/91; B60K 2370/169; B60K 37/02; B60K 2370/188; B60K 2370/332; B60K 2370/341; B60L 58/00; B60L 58/12; B60L 2250/16; G02B 6/0016; G01D 11/28; Y02T 10/7005; Y02T 10/6286; Y02T 10/7044

See application file for complete search history.

(56) References Cited

U.S. PATENT DOCUMENTS

| | | | | |
|---|---|---|---|---|
| 9,597,970 | B2* | 3/2017 | DeBoer, III | B60L 53/305 |
| 9,718,399 | B2* | 8/2017 | Nirei | G01D 11/28 |
| 10,300,848 | B2* | 5/2019 | Frens | G01D 11/28 |
| 2006/0285308 | A1* | 12/2006 | Birman | B60K 35/00 |
| | | | | 362/23.15 |
| 2011/0051393 | A1* | 3/2011 | Ishikawa | G01D 11/28 |
| | | | | 362/23.19 |
| 2015/0102776 | A1* | 4/2015 | Said | B60L 53/30 |
| | | | | 320/109 |
| 2018/0334052 | A1* | 11/2018 | Hwang | H01R 13/5213 |

* cited by examiner

*Primary Examiner* — Peggy A Neils

(74) *Attorney, Agent, or Firm* — Reising Ethington, P.C.

(57) ABSTRACT

Multi-color illumination devices that can be used in various indicator-related or ambient lighting applications, particularly for vehicles. In accordance with one embodiment, the multi-color illumination device includes a light guide having a first end and a second end, a first light source located adjacent the first end of the light guide, and a second light source located adjacent the second end of the light guide. The multi-color illumination device is configured for attachment to a controller configured to illuminate the first light source, the second light source, or both the first light source and the second light source in accordance with one or more operation parameters to provide a status indication.

17 Claims, 10 Drawing Sheets

MULTI-COLOR ILLUMINATION DEVICE

FIELD

The present invention relates generally to multi-color illumination devices, and more particularly, to multi-color illumination devices that can be used in various indicator-related or ambient lighting applications.

BACKGROUND

With applications such as multi-color indicator lamps, multiple light sources and/or multiple colors of light may be used to indicate various modes, statuses, etc. Oftentimes, the multi-color indicator lamps or other multi-color light applications require the use of many light sources such as light emitting diodes (LEDs) that are lit up in sequence to indicate a quality or feature such as a charge status of an electric vehicle, in one example. Using fewer light sources can decrease the power needs and simplify the system.

SUMMARY

In accordance with one embodiment, there is provided a multi-color illumination device, comprising: a light guide having a first end and a second end; a first light source located adjacent the first end of the light guide; a second light source located adjacent the second end of the light guide, wherein the multi-color illumination device is configured for attachment to a controller to illuminate the first light source, the second light source, or both the first light source and the second light source in accordance with one or more operation parameters to provide a status indication.

In accordance with another embodiment, there is provided a multi-color illumination device, comprising: a light guide; a first light source; and a second light source, wherein the multi-color illumination device is configured for attachment to a controller configured to illuminate the first light source in accordance with a first operation parameter for a first status indication, illuminate the second light source in accordance with a second operation parameter for a second status indication, and illuminate both the first light source and the second light source in accordance with a third operation parameter for a third status indication.

In accordance with yet another embodiment, there is provided a multi-color illumination device, comprising: a light guide; a first light source; and a second light source, wherein the multi-color illumination device is configured for attachment to a controller configured to illuminate both the first light source and the second light source with an operation parameter for a status indication, and form a transition zone between emitted light from the first light source and emitted light from the second light source, wherein a location of the transition zone provides the status indication.

DRAWINGS

Preferred exemplary embodiments will hereinafter be described in conjunction with the appended drawings, wherein like designations denote like elements, and wherein.

DESCRIPTION

A multi-color illumination device as described herein can effectively provide various combinations of different light colors through the use of fewer light sources. The multi-color illumination device can be used, for example, in a multi-color indicator lamp to provide information relating to statuses, modes, etc. depending on the operation of the light sources. In one embodiment, the multi-color illumination device generates variable light output to indicate the charge status of a vehicle. By varying the intensity or another operation parameter of the light sources (e.g., dialing the intensity of one light source up while dialing the intensity of another light source down), charge status can be indicated with just two light sources. Minimizing the number of light sources can decrease power requirements and simplify the wiring and/or control scheme.

Figure 1:
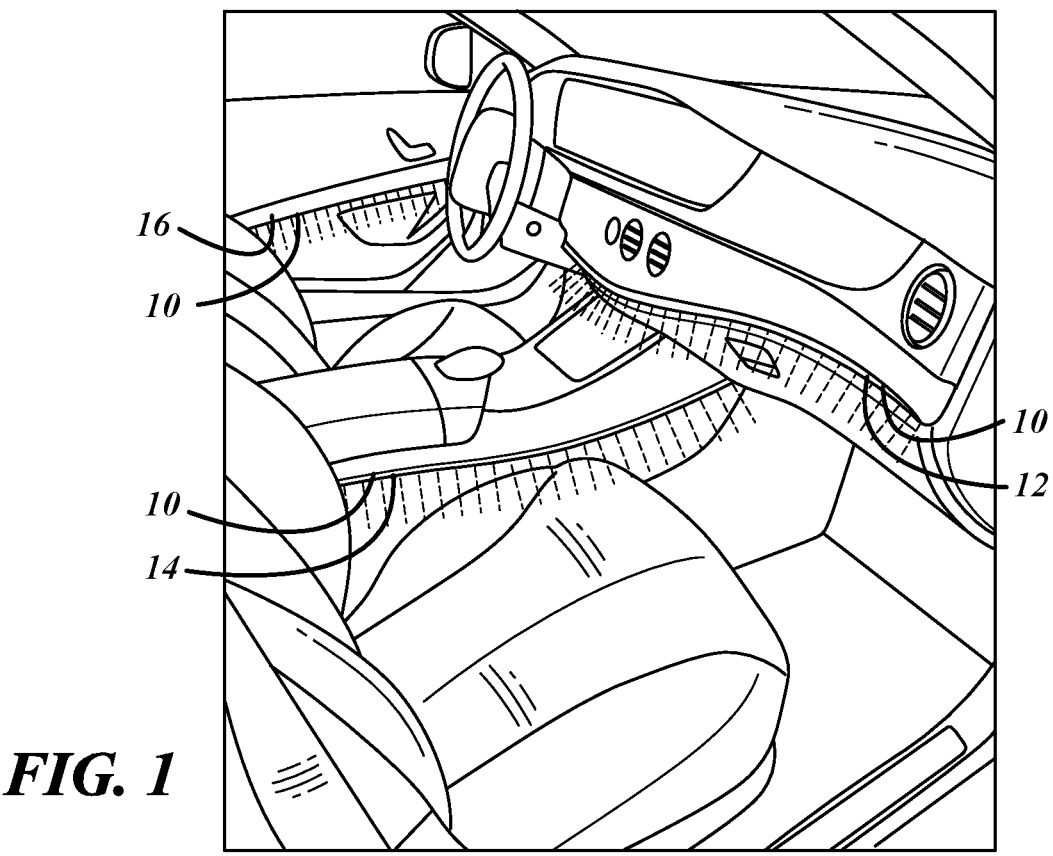
FIG. 1 shows various multi-color illumination devices.
Figure 2:
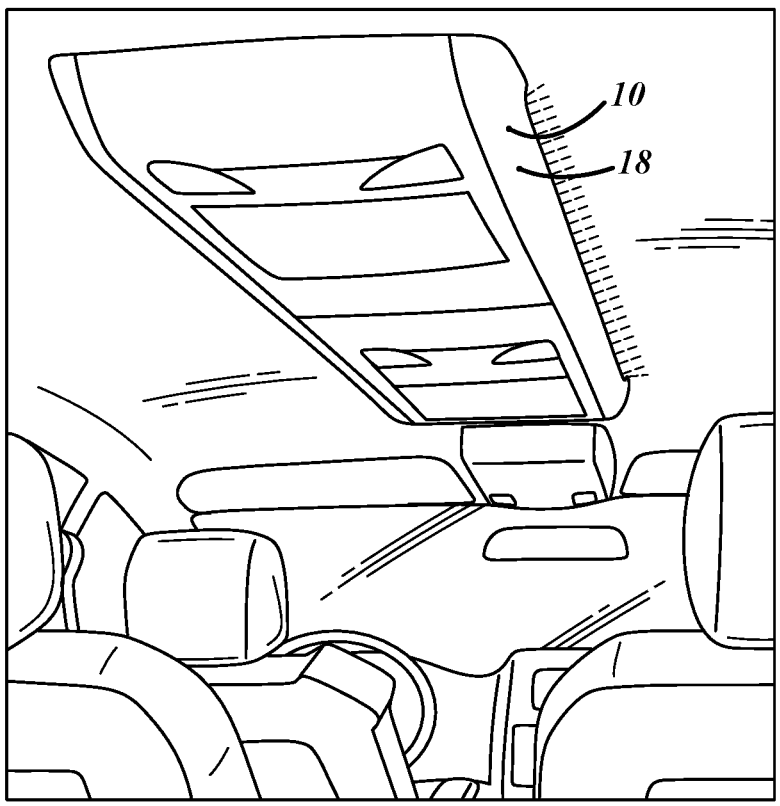
FIG. 2 shows another embodiment of a multi-color illumination device.
Figure 3:
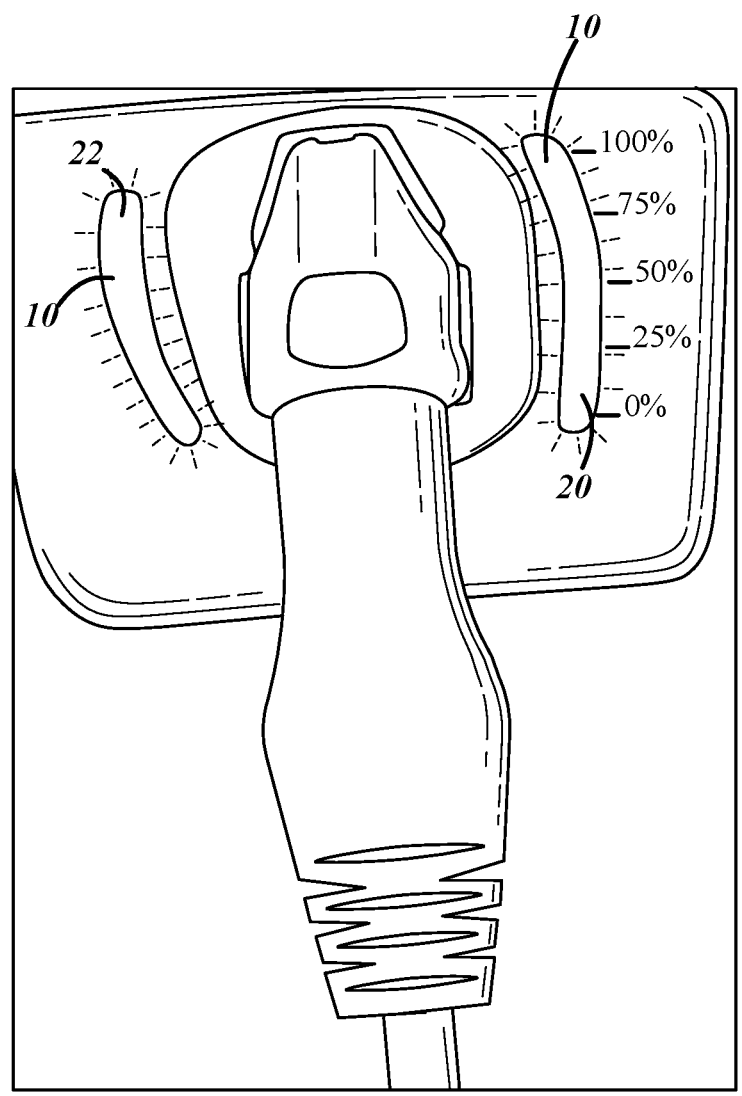
FIG. 3 shows another embodiment of a multi-color illumination device that may be used as a multi-color charge status indicator.

FIGS. 1-3 show various applications of a multi-color illumination device 10, although other vehicle-based or non-vehicle-based applications for the multi-color illumination device are certainly possible. FIG. 1 shows various embodiments of the multi-color illumination device 10 used as a dash panel light 12, a center console light 14, and a door panel light 16 in a vehicle. FIG. 2 shows an embodiment of the multi-color illumination device 10 used as a headliner or overhead console light 18 in a vehicle. FIG. 3 shows an embodiment of the multi-color illumination device 10 used as a multi-color indicator lamp 20, along with a second multi-color indicator lamp 22 in a hybrid electric or electric vehicle.

The operational features of the multi-color illumination device 10 are described in the context of the multi-color indicator lamp 20 depicted in FIG. 3. Skilled artisans will appreciate that control schemes, method parameters, etc., can be varied and will depend on the desired application for the multi-color illumination device 10. The illustrated embodiment in FIG. 3 is a multi-color indicator lamp 20 for an exterior vehicle charging port, although other vehicle-based or non-vehicle-based applications for the multi-color illumination device are certainly possible. For example, the multi-color illumination device 10 could be used in any other implementation where it is desirable to provide two or more colors of light.

The multi-color illumination device 10 used as the multi-color indicator lamp 20 is schematically illustrated according to one operation sequence in FIGS. 4-8. The multi-color illumination device 10 may have other components that are not illustrated in at least some of the schematic representations, such as a housing, one or more printed circuit boards (PCBs), a controller or electronic control unit (ECU) etc. The multi-color illumination device 10 includes a light guide 24, a first light source 26, and a second light source 28. The multi-color illumination device 10 may also include one or more separate lenses 30 that are generally situated between the light guide 24 and a user or onlooker looking from the viewing direction. The lens 30 is optional, and in other embodiments, the light guide 24 may provide a sufficient amount of diffusion such that a separate lens is not necessary. The lens 30 may be more useful in applications with longer light guides 24 (e.g., FIGS. 1 and 2), and the lens 30 may be situated very close to the light guide 24.

The light guide 24 has a first end 32 and a second end 34. The first light source 26 is located adjacent the first end 32 of the light guide 24, and the second light source 28 is located adjacent the second end 34 of the light guide 24. The light guide 24 may be a generally cylindrical light pipe or have any other operable configuration. For example, the light guide 24 may have a more rectangular prismatic shape. With such a shape, it may be possible to include one or more reflective walls to help encourage light transmission toward the lens 30 or out towards a user if there is no separate lens 30. The light guide 24 is preferably made from an acrylic material, although other transparent or translucent materials may be used, such as a polycarbonate (PC) material. PC may be preferable for exterior applications where a more high-impact material is desirable.

The light sources 26, 28 may be LEDs, although other light source types are certainly possible. In the illustrated embodiments, only one LED 26, 28 is used on either side of the light guide 24, although it may be possible to use more than one LED on either side of the light guide 24. Each light source may be an RGB LED or each light source may be only one particular color. If using more than one LED on either side of the light guide 24, it may be helpful to have matching colors on either side. For example, at the first side 32 of the light guide 24, there may be a red LED and a blue LED, and at the second side 34 of the light guide 24, there may also be a red LED and a blue LED. In such an embodiment, for illuminating the entirety of the light guide 24 with red light, both red light sources 26, 28 on either side 32, 34 of the light guide may be illuminated. Other examples with multiple light sources on either side of the light guide are certainly possible, but the example below provides the use of one light source 26, 28 on either side of the light guide 24 (red light is schematically illustrated in the figures with dots and blue light is schematically illustrated with diagonal stripes). Such an embodiment may have a more simplified operating scheme and may require less power per LED. Further, finer resolution detail can be provided with the use of just two light sources 26, 28 and allowing one to overpower the other in a region of the light guide 24. Accordingly, for implementations where the multi-color illumination device 10 is used as a multi-color indicator lamp 20 for indicating a vehicle state of charge, more resolution with regard to the state of charge can be achieved using fewer light sources.

Figure 4:
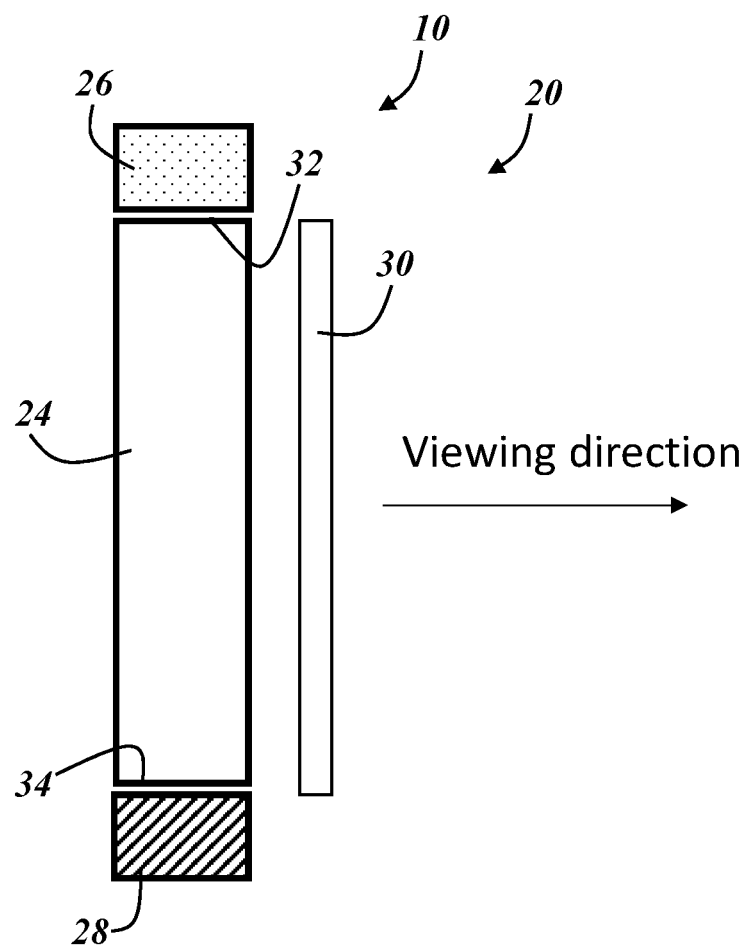
FIG. 4 is a simplified schematic view of the multi-color illumination device of FIG. 3 when the multi-color illumination device is not illuminated.

FIG. 4 schematically illustrates a multi-color illumination device 10 used as a multi-color indicator lamp 20, where neither the first light source 26 nor the second light source 28 are illuminated. In the example illustrated in FIGS. 4-8, the first light source 26 is illustrated as a red light source and the second light source 28 is illustrated as a blue light source.

Other color combinations are certainly possible. In one example, it is preferable if one of the light sources 26, 28 provides white light and the other light source provides red, green, or blue light, or is an RGB LED. Using white light can provide a cleaner transition zone between the two light sources 26, 28 since the white light will not substantially change the color of the mixed light at the transition zone.

FIGS. 4-8 illustrate a method of using the multi-color illumination device 10 as a multi-color indicator lamp 20 whereby the light sources 26, 28 are operated in accordance with one or more operating parameters to provide a status indication. More particularly, the multi-color indicator lamp 20 is a multi-color charge status indicator that provides a user with a visual indication of the approximate state of charge of an electric or hybrid electric vehicle. Accordingly, the device 10 or a controller for controlling the light sources 26, 28 may receive inputs from a vehicle module such as a body control module or another control module via a CAN bus or another connection.

Figure 5:
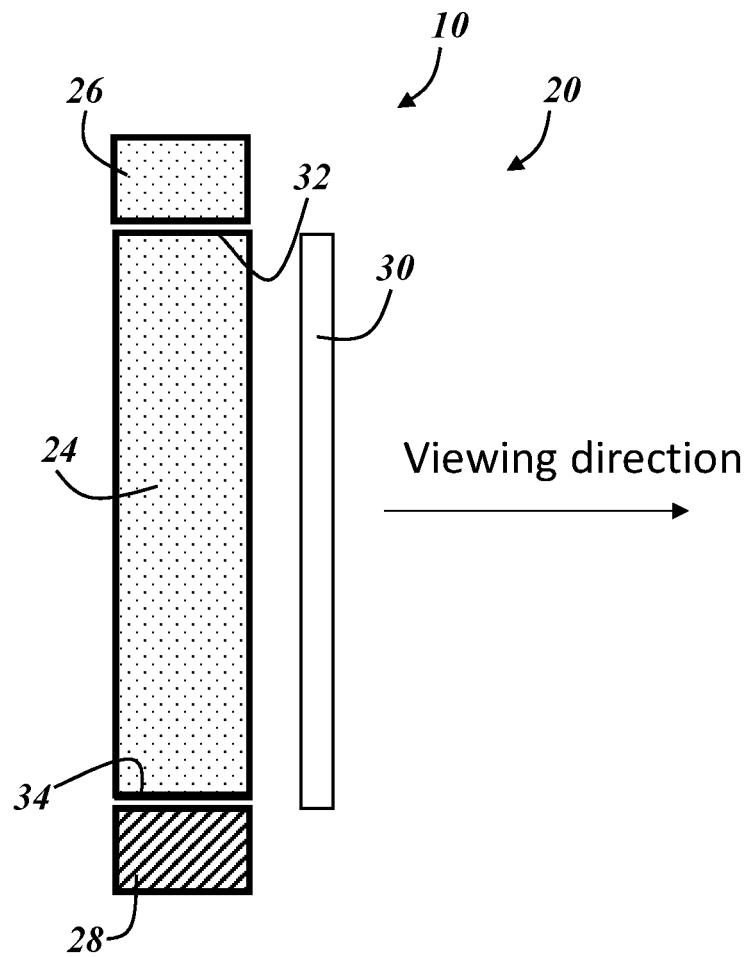
FIG. 5 is a simplified schematic view of the multi-color illumination device of FIGS. 3-4 illustrating a 0% or very low charge status.
Figure 6:
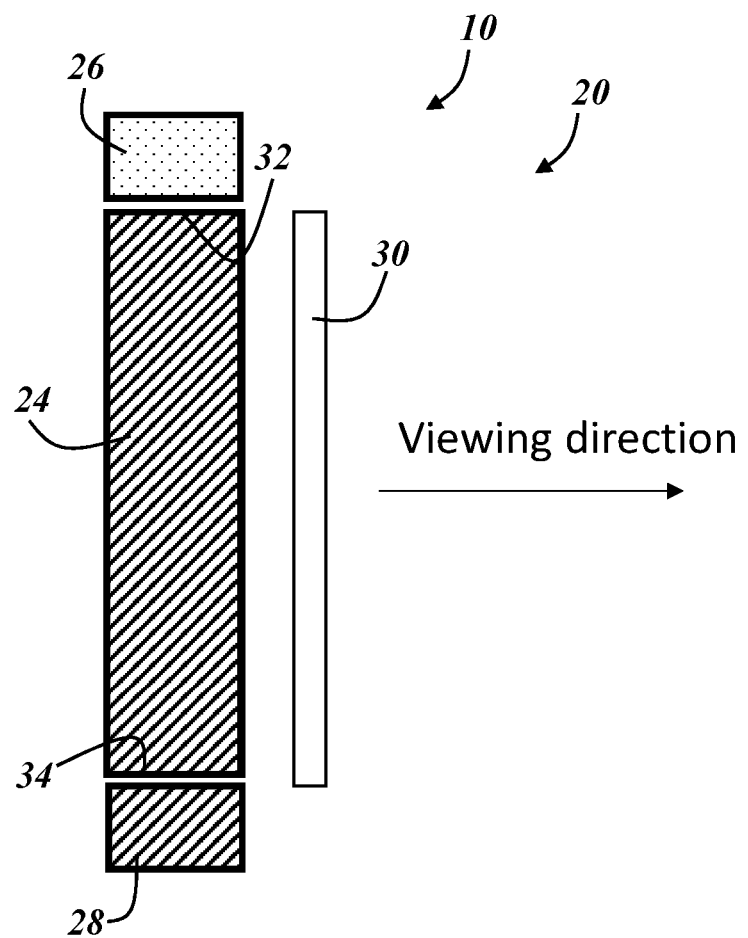
FIG. 6 is a simplified schematic view of the multi-color illumination device of FIGS. 3-5 illustrating a 100% or fully charged status.

The illustrated operating example assumes both light sources 26, 28 have the same optical output power or luminous power (lm). If the optical output power for the light sources 26, 28 is different, proportional adjustments can be made to help encourage color and/or intensity uniformity of the light emitted from each of the light sources. In FIG. 5, the first light source 26 is illuminated in accordance with a first operation parameter (e.g., optical output power of 100% for the first light source and an optical output power of 0% for the second light source 28) to provide a status indication that there is about 0% or almost no charge. In FIG. 6, the second light source 28 is illuminated in accordance with a second operation parameter (e.g., optical output power of 0% for the first light source 26 and an optical output power of 100% for the second light source 28) to provide a status indication that there is about 100% or full charge.

Figure 7:
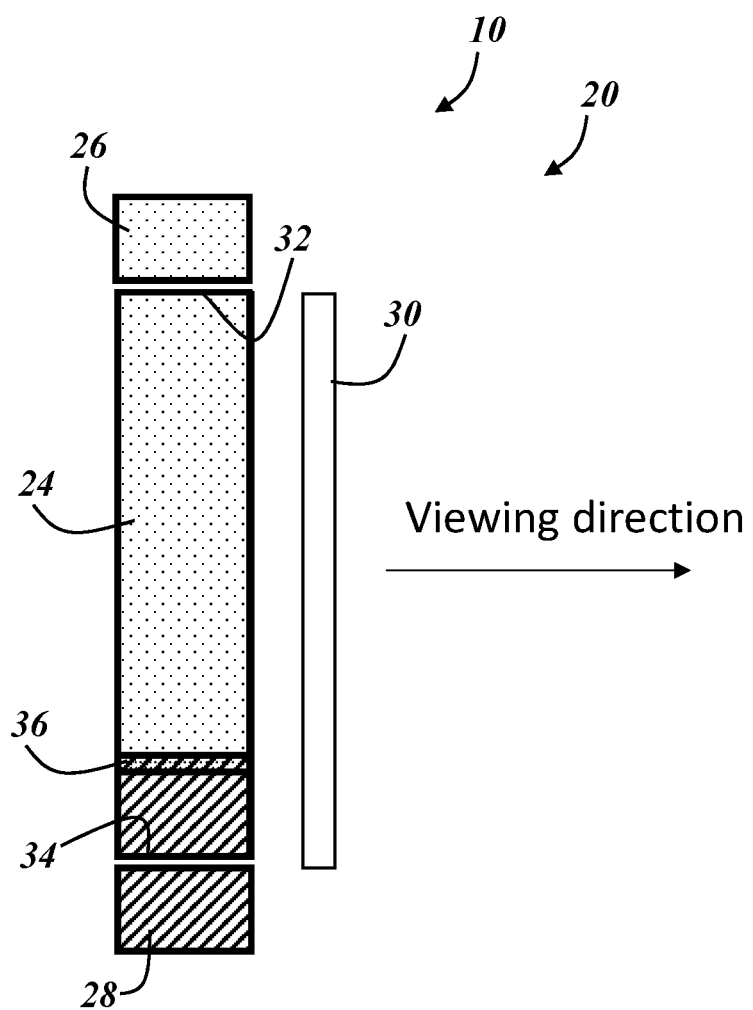
FIG. 7 is a simplified schematic view of the multi-color illumination device of FIGS. 3-6 illustrating a charge status of about 10%.
Figure 8:
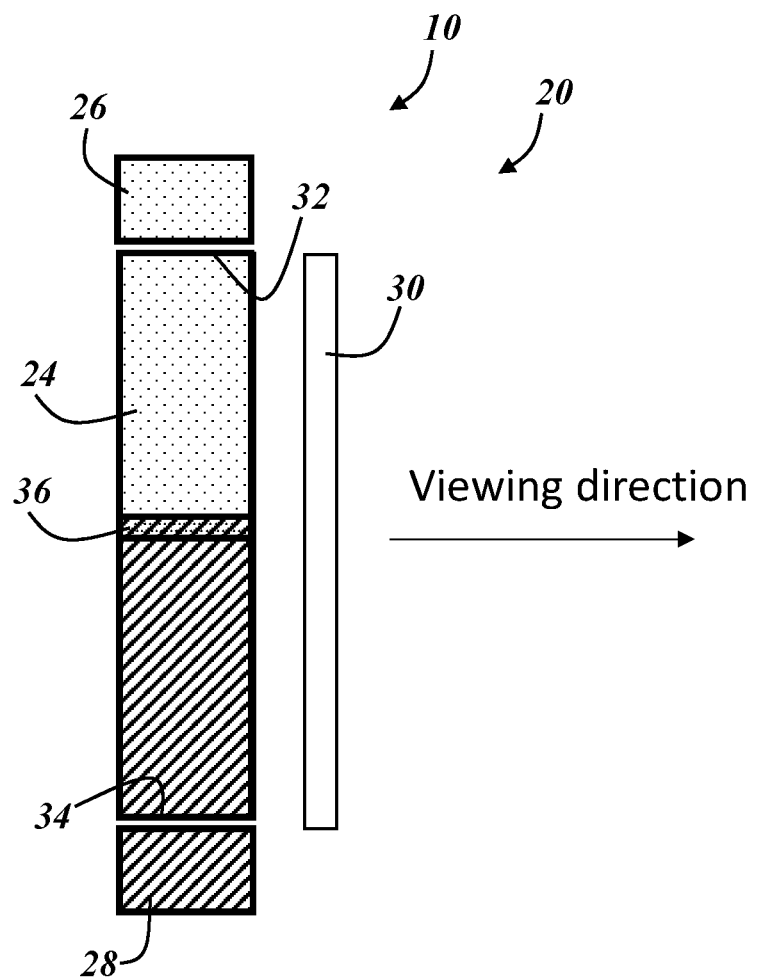
FIG. 8 is a simplified schematic view of the multi-color illumination device of FIGS. 3-7 illustrating a charge status of about 50%.

FIGS. 7 and 8 illustrate examples of illuminating both the first light source 26 and the second light source 28 in accordance with a third operation parameter for a third status indication that falls somewhere between the first and second status indications. When both light sources 26, 28 are illuminated, a transition zone 36 is formed. Some color mixing can occur at the transition zone 36. For example, in the illustrated embodiment, the transition zone 36 may be a small purple colored line where the red and blue light mixes. As described above, a white LED may be beneficial in some embodiments, because at the transition zone 36, a third, mixed color at the demarcation will be less apparent. In FIG. 7, both the first light source 26 and the second light source 28 are operated in accordance with a third operation parameter (e.g., optical output power of 90% for the first light source 26 and an optical output power of 10% for the second light source 28) to provide a status indication that there is about 10% charge. Accordingly, the transition zone 36 in FIG. 7 is located at about 10% of the length of the light guide 24. In FIG. 8, both the first light source 26 and the second light source 28 are operated in accordance with yet another operation parameter (e.g., optical output power of 50% for the first light source 26 and an optical output power of 50% for the second light source 28) to provide a status indication that there is about 50% charge. Accordingly, the transition zone 36 in FIG. 8 is located at or towards the center of, or at about 50% of, the length of the light guide 24.

The status indication may vary depending on the implementation of the multi-color illumination device 10. For example, with the more ambient type applications illustrated in FIGS. 1 and 2, the status indication may be different than a charge status. Accordingly, in some embodiments, the status indication may include a more arbitrary design pattern or light display that indicates one or more events. For example, a certain lighting scheme may be displayed as a welcome function when a door of the vehicle is opened. In another example, the status indication may be that a certain illumination display function is activated. More particularly, a dash panel button or the like may be depressed, causing one of the lights 12-18 to display a certain color scheme or pattern. Other status indication types are certainly possible.

The operation parameter which may be used to provide the status indication, can be different than a relative proportion of the optical output power, as described above. For example, the operation parameter may be a certain current that is applied to each of the light sources 26, 28. In another example, the operation parameter may be an input power that is used for each of the light sources 26, 28. If a microcontroller or the like is used for carrying out the method, adjusting the duty cycle of pulse width modulated (PWM) control of each of the light sources 26, 28 may serve to provide various status indications. Other examples for the operation parameter are certainly possible. Moreover, depending on the operation parameter, the proportional change for the various status indications will likely need to be adjusted. The example of FIGS. 4-8 is less complex, in that the change in the operation parameter is directly proportional to the change in status indication. This relationship between the adjustment of the operation parameter and the resulting change in status indication may not be as direct in other embodiments. For example, the proportionality of the optical output power may be logarithmic or exponential and may depend on the desired intensity. Further, additional adjustments may need to be made depending on the particular colors used. To cite one example, blue typically overpowers yellow for reasonably similar output powers. In a particular example, a blue LED at 10 lm mixing with a yellow LED at 20 lm will result in a bluish white color, even though the yellow is two times brighter. Changing the output power may account for such issues, as a yellow LED that is about five times or more brighter will overpower a blue LED. Other adjustments to correlate the change in the operation parameter with the change in status indication are certainly possible.

Figure 9:
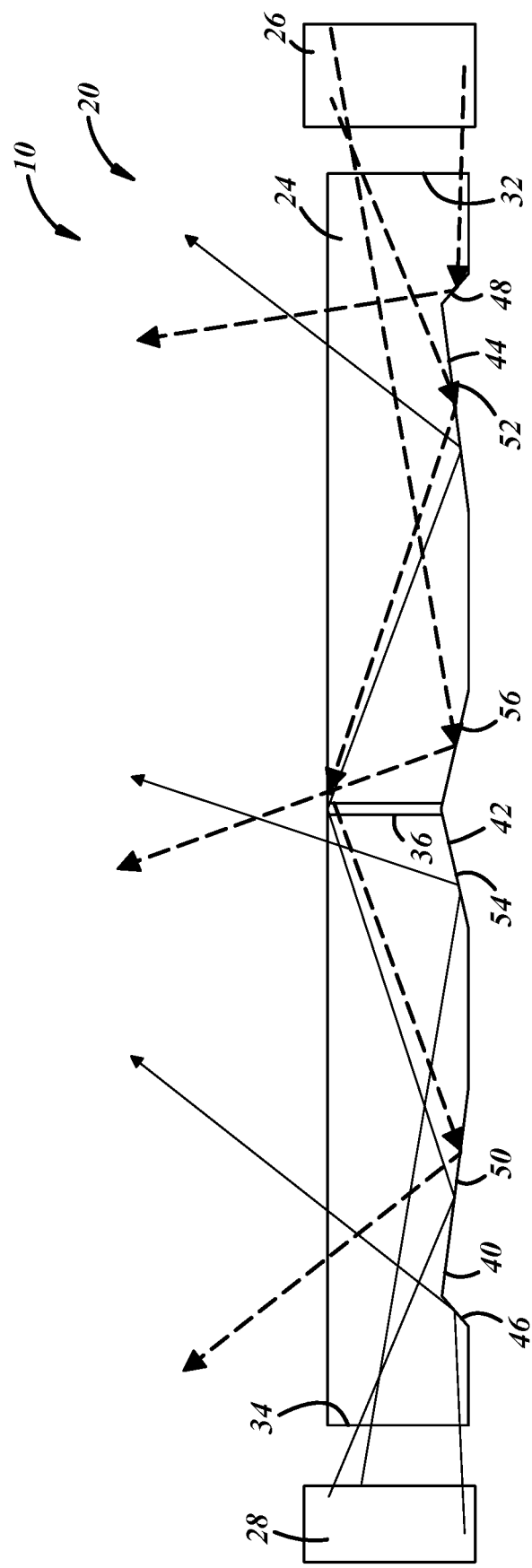
FIG. 9 is a simplified schematic view of the multi-color illumination device of FIGS. 3-8.

FIG. 9 illustrates an embodiment of the light guide 24 having optical features 40, 42, 44. Optical features may include scattering flanges, notches or prisms. In the illustrated embodiment, optical features 40, 42, 44 are prisms that are used to reflect light out of the light guide such that light from the near source is reflected out by the small, farther-spaced portions 46, 48 of the prism as seen from that direction, while farther from the source the light is reflected from the larger, more closely-spaced portions 50, 52 of the prisms 40, 44 encountered from that direction. FIG. 9 is not to scale and merely an example, as a typical light guide 24 will likely have many more prisms than the illustrated embodiment. Moreover, it is possible for prisms that are closer to each light source 26, 28 to have longer prismatic portions 50, 52, whereas the length of the prismatic portions 50, 52 may gradually decrease in each prism getting closer to the center of the light guide 24 (which in this embodiment, is where the transition zone 36 is generally located).

In other methods used to extract light from a light guide, the optical features tend to be more concentrated further from the light source and more widely distributed in number closer to the light source. Such a configuration may not be as desirable with the multi-color illumination device 10, given the first light source 26 at the first end 32 and the second light source 28 at the second end 34. Accordingly, in some embodiments, the light guide 24 may include optical features that are more concentrated in number at the center of light guide and more widely distributed toward each of the first and second ends 32, 34. In these embodiments, the light guide 24 may have a symmetrical distribution of optical features along the length of the light guide. The central prism 42 may have symmetrical side walls 54, 56 which reinforces the symmetrical distribution of optical features along the length of the light guide. The prisms 40, 44 can be also used to reflect light out of the light guide with an asymmetrical pattern depending on the direction of light incidence on the prism. Optical features may also be distributed based on the light colors used for each of the light sources 26, 28. To cite one example, since blue light scatters more than red light, it may be desirable to use more optical features for red light rather than blue light to enhance the color uniformity appearance.

Figure 10:
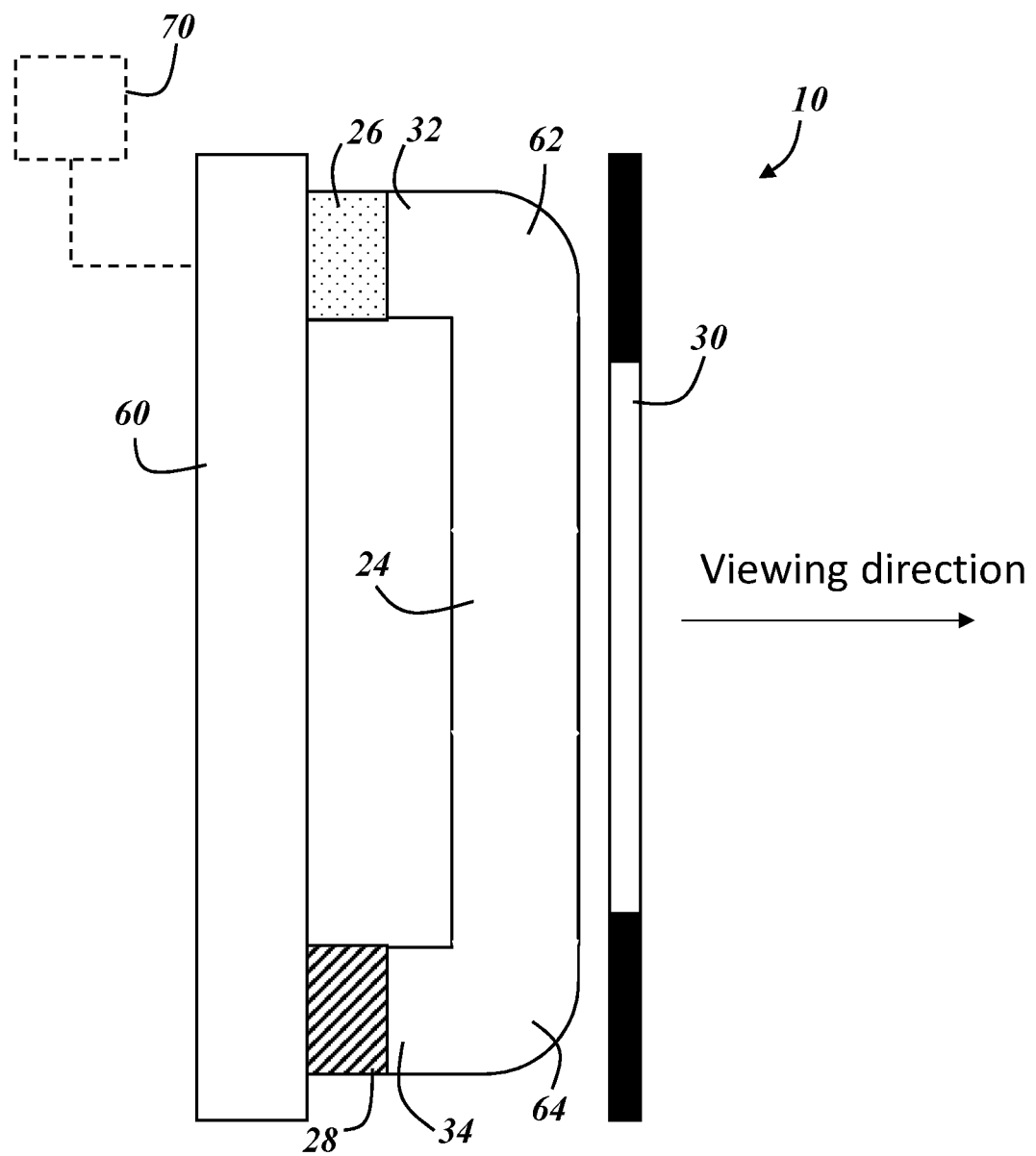
FIG. 10 is a simplified schematic view of a multi-color illumination device according to another embodiment.
Figure 11:
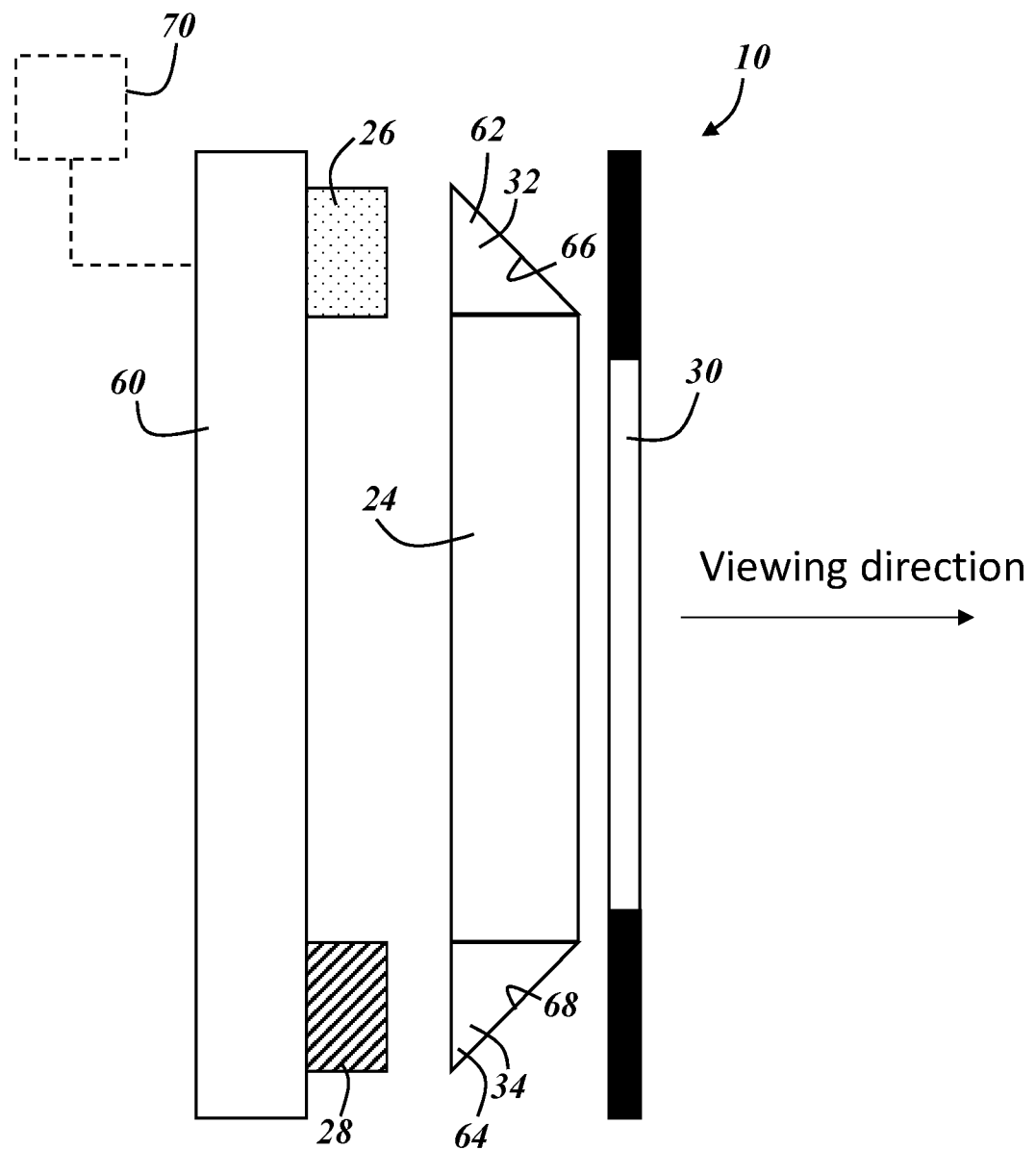
FIG. 11 is a simplified schematic view of a multi-color illumination device according to yet another embodiment.

FIGS. 10 and 11 illustrate other embodiments of the multi-color illumination device 10, and in these embodiments, the structure of the light guide 24 is different. These embodiments schematically illustrate an alternate method of launching light into the light guide 24 that uses a monolithic PCB 60. The light sources 26, 28 are both attached to a common PCB 60, and first and second angled guiding portions 62, 64 are provided at the first and second ends 32, 34 of the light guide, respectively. In FIG. 10, the first and second angled guiding portions 62, 64 are curved ends that facilitate light transmission to the main portion of the light guide 24. The first and second angled guiding portions 62, 64 are advantageously angled toward the PCB 60, and accordingly, are advantageously angled toward each of the light sources 26, 28 that are mounted to the PCB 60. In FIG. 11, the first and second angled guiding portions 62, 64 are more sharply angled prismatic ends that facilitate light transmission to the main portion of the light guide 24. The prismatic portions 66, 68 of this embodiment are angled away from the main portion of the light guide 24 toward the PCB 60, and accordingly, toward each of the light sources 26, 28 that are mounted to the PCB 60.

In both embodiments illustrated in FIGS. 10 and 11, the common PCB 60 may provide for easier connection to a controller 70 and integration within the vehicle. As previously described, the controller 70 may be a standalone electronic control unit (ECU) dedicated to the device 10, or the controller could be a body control module or other vehicle controller that also controls other lights or devices within the vehicle. In some embodiments, the controller 70 may be connected to the device 10 via the vehicle CAN bus or some other operable connection. The method of operation described above with regard to the embodiment illustrated in FIGS. 4-8 is also applicable to the embodiments of FIGS. 10 and 11, and similarly, aspects of the controller 70/PCB 60 arrangement illustrated in FIGS. 10 and 11 may also be applicable to the embodiment of FIGS. 4-8.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A multi-color illumination device, comprising:
a light guide having a first end and a second end;
a first light source located adjacent the first end of the light guide;
a second light source located adjacent the second end of the light guide, wherein the multi-color illumination device is configured for attachment to a controller configured to illuminate the first light source, the second light source, or both the first light source and the second light source in accordance with one or more operation parameters to provide a status indication, wherein the first light source is configured to emit light of a first wavelength and the second light source is configured to emit light of a second wavelength;
a first additional light source at the first end of the light guide that is configured to emit light of the second wavelength; and
a second additional light source at the second end of the light guide that is configured to emit light of the first wavelength,
wherein each of the first light source, the second light source, the first additional light source and the second additional light source is a white light emitting diode (LED), a single color LED, or a red-green-blue (RGB) LED.

2. The multi-color illumination device of claim 1, wherein the first light source is a white light emitting diode (LED) and the second light source is a red-green-blue (RGB) LED.

3. The multi-color illumination device of claim 1, further comprising a lens configured to be located between the light guide and an onlooker of the multi-color illumination device.

4. The multi-color illumination device of claim 1, wherein the one or more operation parameters includes an optical output power, an applied current, an input power, or an adjustment to a duty cycle.

5. The multi-color illumination device of claim 1, wherein the light guide includes a symmetrical distribution of optical features.

6. The multi-color illumination device of claim 5, wherein the light guide includes a central prism with symmetrical sidewalls.

7. The multi-color illumination device of claim 5, wherein the optical features are more concentrated in number toward a center of the light guide than toward each of the first and second ends.

8. The multi-color illumination device of claim 1, wherein the light guide includes a plurality of prisms, each prism having a prismatic portion, wherein the prisms that are closer to each of the first and second light sources have longer prismatic portions than the prismatic portions toward a center of the light guide.

9. The multi-color illumination device of claim 1, wherein the controller is configured to illuminate the first light source in accordance with a first operation parameter for a first status indication, illuminate the second light source in accordance with a second operation parameter for a second status indication, and illuminate both the first light source and the second light source in accordance with a third operation parameter for a third status indication.

10. The multi-color illumination device of claim 1, wherein the controller is configured to illuminate the first light source and the second light source to form a transition zone between emitted light from the first light source and emitted light from the second light source, wherein a location of the transition zone provides the status indication.

11. The multi-color illumination device of claim 1, wherein the light guide includes a first angled guiding portion and a second angled guiding portion.

12. A multi-color illumination device, comprising:
a light guide having a first end with a first angled guiding portion and a second end with a second angled guiding portion;
a first light source located adjacent the first end of the light guide; and
a second light source located adjacent the second end of the light guide, wherein the multi-color illumination device is configured for attachment to a controller configured to illuminate the first light source, the second light source, or both the first light source and the second light source in accordance with one or more operation parameters to provide a status indication, wherein the first light source and the second light source are mounted to a common printed circuit board (PCB) and the first angled guiding portion and the second angled guiding portion are both angled toward the PCB, and wherein the first angled guiding portion and the second angled guiding portion are sharply angled prismatic ends.

13. A multi-color charge status indicator comprising the multi-color illumination device of claim 1.

14. An electric or hybrid electric vehicle comprising the multi-color charge status indicator of claim 13.

15. A multi-color illumination device, comprising:
a light guide having a first end, a second end, and a distribution of optical features between the first end and the second end, wherein the optical features are prisms that are more concentrated in number toward a center of the light guide and more widely distributed toward each of the first and second ends;
a first light source; and
a second light source, wherein the multi-color illumination device is configured for attachment to a controller configured to illuminate the first light source in accordance with a first operation parameter for a first status indication, illuminate the second light source in accordance with a second operation parameter for a second status indication, and illuminate both the first light source and the second light source in accordance with a third operation parameter for a third status indication.

16. The multi-color illumination device of claim 15, wherein the first status indication is a 0% charge indication, the second status indication is a 100% charge indication, and the third status indication is a charge indication between 0% and 100%.

17. The multi-color illumination device of claim 15, wherein the optical features are distributed based on the amount of color-based scattering from each of the first and second light sources.

* * * * *